(12) United States Patent
Reed et al.

(10) Patent No.: US 7,755,047 B2
(45) Date of Patent: Jul. 13, 2010

(54) CLIP-ON INFRARED IMAGER

(75) Inventors: Matthew W. Reed, New Boston, NH (US); Sheldon Schwartz, II, Auburn, NH (US); Joseph C. Ottney, Londonderry, NH (US)

(73) Assignee: L-3 Insight Technology Incorporated, Londonderry, NH (US)

( * ) Notice: Subject to any disclaimer, the term of this patent is extended or adjusted under 35 U.S.C. 154(b) by 0 days.

(21) Appl. No.: 12/430,930

(22) Filed: Apr. 28, 2009

(65) Prior Publication Data

US 2009/0200468 A1 Aug. 13, 2009

Related U.S. Application Data

(63) Continuation of application No. 11/550,563, filed on Oct. 18, 2006, now Pat. No. 7,541,581.

(51) Int. Cl.
*H01L 31/00* (2006.01)
(52) U.S. Cl. .................................... 250/330
(58) Field of Classification Search ............... 250/330, 250/332
See application file for complete search history.

(56) References Cited

U.S. PATENT DOCUMENTS

2002/0030163 A1* 3/2002 Zhang ..................... 250/330

\* cited by examiner

*Primary Examiner*—David P Porta
*Assistant Examiner*—Marcus H Taningco

(57) ABSTRACT

A clip-on infrared imager may be coupled and decoupled to an existing night vision system to add infrared imaging to provide a fused image through at least one of the night vision system eyepieces.

20 Claims, 7 Drawing Sheets

CLIP-ON INFRARED IMAGER

CROSS REFERENCE TO RELATED APPLICATIONS

The present application is a continuation of and claims priority to U.S. patent application Ser. No. 11/550,563, filed Oct. 18, 2006, now U.S. Pat. No. 7,541,581 the entire disclosure of which is incorporated herein by reference in its entirety.

BACKGROUND OF THE INVENTION

Night vision systems include image intensification, thermal imaging, and fusion monoculars, binoculars, and goggles, whether hand-held, weapon mounted, or helmet mounted. Image intensification systems are typically equipped with one or more image intensifier tubes to allow an operator to see visible wavelengths of radiation (approximately 400 nm to approximately 900 nm). They work by collecting the tiny amounts of light, including the lower portion of the infrared light spectrum, that are present but may be imperceptible to our eyes, and amplifying it to the point that an operator can easily observe the image. These systems have been used by soldier and law enforcement personnel to see in low light conditions, for example at night or in caves and darkened buildings. A drawback to image intensification systems is that they may be attenuated by smoke and heavy sand storms and may not see a person hidden under camouflage.

Thermal imagers allow an operator to see people and objects because they emit thermal energy. These systems operate by capturing the upper portion of the infrared light spectrum (approximately 7000 nm to approximately 14,000 nm), which is emitted as heat by objects instead of simply reflected as light. Hotter objects, such as warm bodies, emit more of this wavelength than cooler objects like trees or buildings. Since the primary source of infrared radiation is heat or thermal radiation, any object that has a temperature radiates in the infrared. One advantage of thermal imagers is that they are less attenuated by smoke and dust and a drawback is that they typically do not have sufficient resolution and sensitivity to provide acceptable imagery of the scene.

Fusion systems have been developed that combine image intensification with a thermal sensor (approximately 7,000 nm to approximately 14,000 nm) in a single enclosure. The image intensification information and the thermal information are fused together to provide an image that provides benefits over just image intensification or just thermal imaging. Whereas image intensifiers can only see visible wavelengths of radiation, the fused system provides additional information by providing long wave information to the operator.

FIG. 1 is a block diagram of an image intensifier system 100 capable of viewing a target or area of interest 108. The electronics and optics are housed in a housing 102, which can be mounted to a military helmet through a mount 128, and are powered by a power source 144. Information from a first image intensification ($I^2$) channel 120A and a second $I^2$ channel 120B is directed to an operator through one or more eyepieces 106 located in an end portion 132A, 132B. The eyepieces 106 have one or more ocular lenses for magnifying and/or focusing the intensified image. The $I^2$ channels 120A, 120B are configured to process information in a first range of wavelengths (the visible portion of the electromagnetic spectrum from approximately 400 nm to approximately 900 nm). The $I^2$ channels 120A, 120B, located in an end portion 130A, 130B of the housing 102, may have an $I^2$ tube 122 and an objective with adjustable focus 124. The housing 102 has two actuators coupled to a power supply 142. The on/off actuator 160 allows the operator to turn the system on and off and the $I^2$ channel gain actuator 162 allows the operator to adjust the gain of the $I^2$ tubes 122.

FIG. 1B is a block diagram of an image intensifier system with a thermal camera and a separate display strapped thereto to provide a picture-in-a-picture view of a scene. The image intensifier system 100 may be the system shown in FIG. 1. A camera 226, for example the Alpha™ camera from Indigo Systems of Goleta, Calif., may output an analog RS170 video signal to a display 234', for example a 640×480 display as incorporated in the CV-3 Video Viewer from Micro Optical of Westwood, Mass. The camera 226 and the display 234' are powered by separate power supplies. A light turning element 232' may be disposed in front of the objective lens 124 of the first channel 120B to allow the visible presentation of the thermal image to be injected into the $I^2$ channel and thereby viewable through the eyepiece 106. The position, size, and focus of the virtual thermal image is affected by the position of the light turning element with respect to the objective lens thereby preventing image fusion or simultaneous view of the thermal and image intensified scenes through the eyepiece.

In a thermal imager, the scene data may be sensed by a two-dimensional array of infrared-detector elements. The detector elements can create a very detailed temperature pattern, which can then be translated into electric impulses that are communicated to a signal-processing unit. The signal-processing unit may then translate the information into data for a display aligned with an eyepiece. Thermal imagers can sense temperatures with range in excess of −40 to +50° C. and can detect changes in temperature as small as 0.025° C. The different temperatures are typically displayed as varying shades between black and white. The display may also display system information as well as scene information.

In a fusion system, the display may be aligned with an image combiner for viewing through one of the eyepieces. Fusion systems typically have the optical axis of the thermal channel physically offset a fixed distance from the optical axis of the $I^2$ channel. The fusion system is typically factory aligned such that the image from the thermal channel is fused and is aligned in the eyepiece with the image from the $I^2$ channel when the image being viewed is at a predetermined distance, often aligned at infinity. At distances different from the predetermined distance, parallax can cause a misalignment of the two images in the eyepiece. The parallax problem exists if the thermal channel and the $I^2$ channels are offset in the horizontal as well as the vertical directions.

BRIEF DESCRIPTION OF THE DRAWINGS

For a better understanding of the invention, together with other objects, features and advantages, reference should be made to the following detailed description which should be read in conjunction with the following figures wherein like numerals represent like parts.

DETAILED DESCRIPTION

Figure 1:
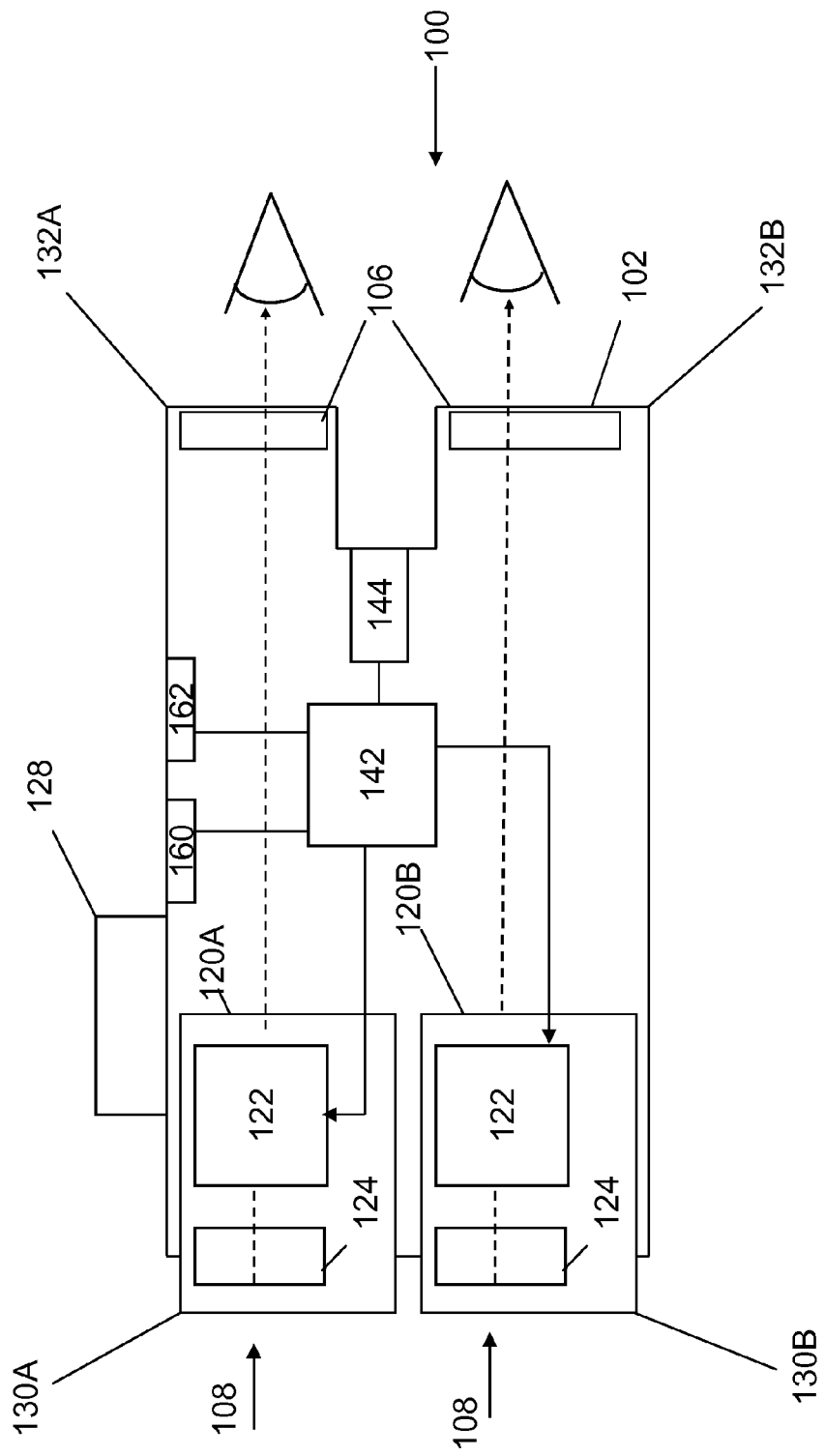
FIG. 1 is a block diagram of an image intensifier system.
Figure 1B:
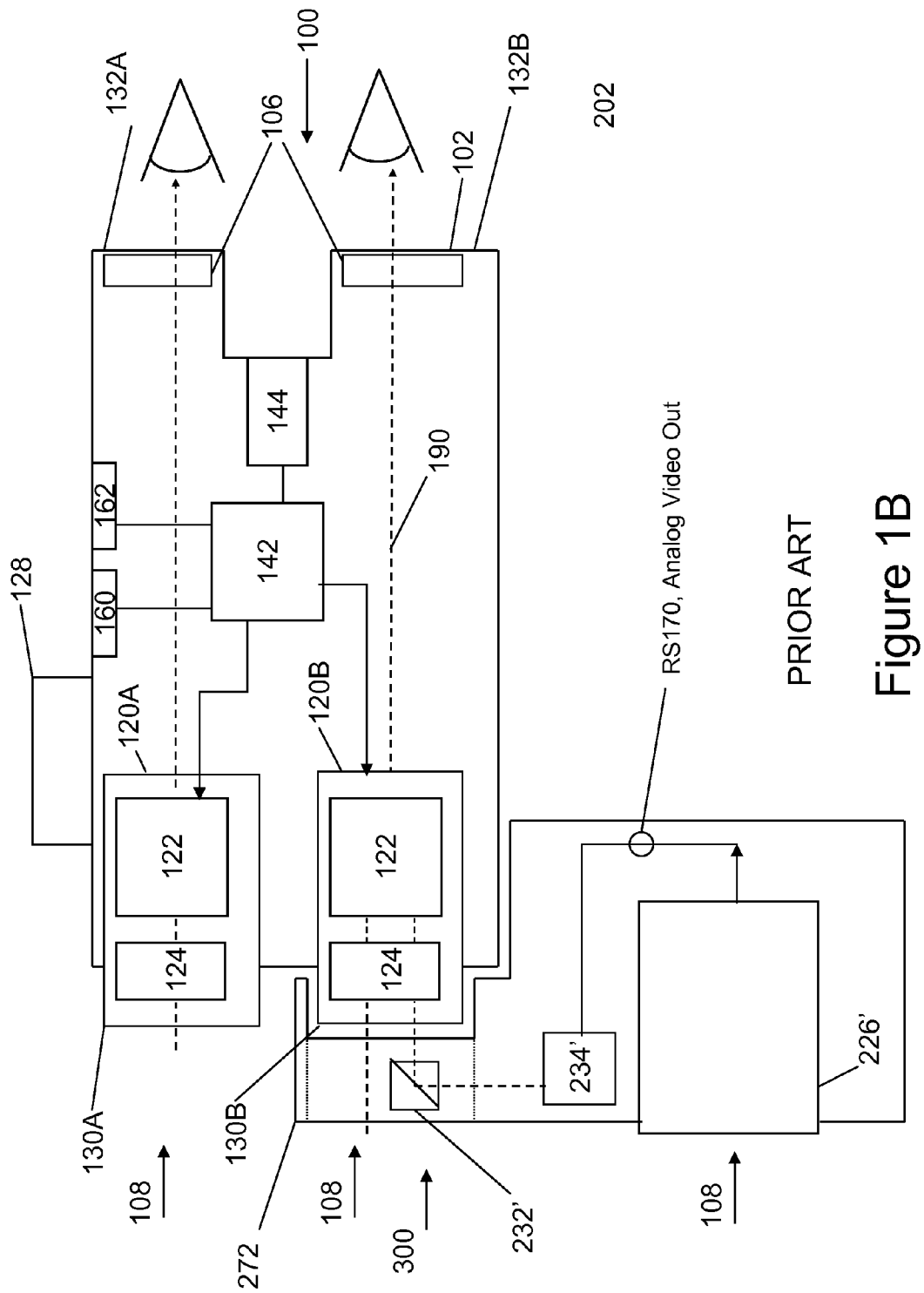
FIG. 1B is a block diagram of an image intensifier system with a thermal camera and a separate display strapped thereto to provide a picture-in-a-picture view of a scene.
Figure 2:
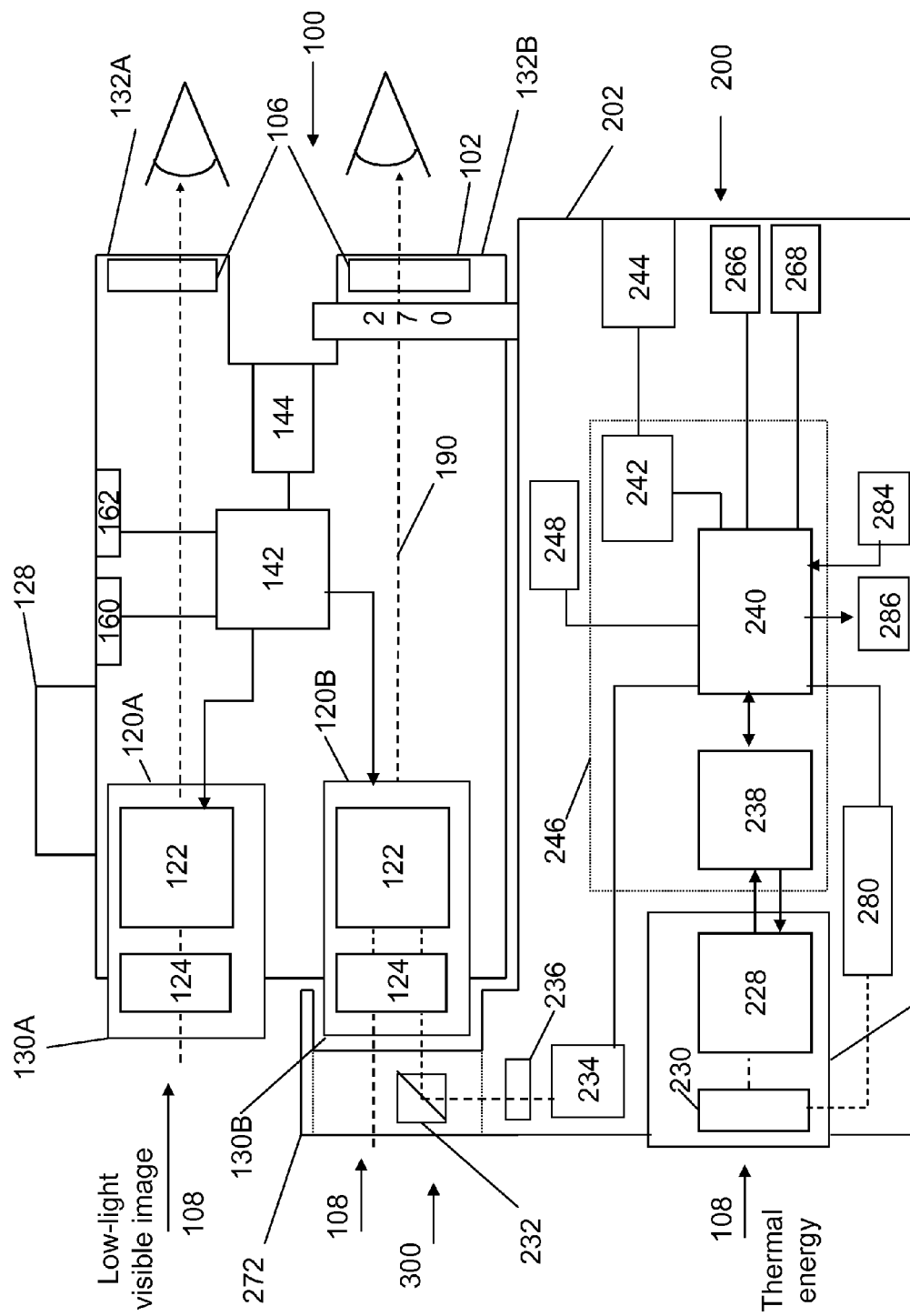
FIG. 2 is a block diagram of a first fusion night vision system consistent with the invention.

FIG. 2 is a block diagram of a fusion night vision system 300 which includes an image intensification system 100 and a clip-on infrared imager 200. The clip-on imager 200 may provide additional information from alternative wavebands (approximately 900 nm to approximately 14,000 nm), i.e., SWIR (shortwave infrared), MWIR (medium wave infrared), or LWIR (long wave infrared) to an existing image intensifier system 100. An operator looking through eyepiece(s) 106 within the housing 102 of the system 100 may be able to see a fused image 190 of a target or area of interest 108. Although the clip-on imager 200 is shown coupled to a binocular device, it may be coupled to a monocular device or goggle without departing from the invention.

The clip-on imager 200 electronics and optics may be at least partially housed in a housing 202. Enclosed at least partially within the housing 202 may be a first channel 226, an analog circuit card assembly 238, a digital circuit card assembly 240, a power circuit card assembly 242, a display 234, a corrector lens 236, and a light turning element 232. The light turning element may be coupled to the portion of the housing 272 adapted to be aligned with the image intensification channel. A channel may be a path through which information representative of a scene travels. The light turning element 232 may be a mirror, prism, corner cube, beam splitter, or other folded optical element. The analog circuit card assembly 238, the digital circuit card assembly 240, and the power circuit card assembly 242 may be combined on a single circuit assembly 246 to process the scene information. The display 234 may be any miniaturized display, for example a 640×480 active matrix liquid crystal display (AMLCD). The clip-on imager 200 may be powered by an internal battery 244. The first channel 226 may be configured to process information in a second range of wavelengths (from approximately 900 nm to approximately 14,000 nm). The low end and the high end of the range of wavelengths may vary without departing from the invention. The first channel 226 may have an alternative waveband sensor 228, and an objective with focus adjustment 230. The sensor 228 may be a long wave infrared focal plane array, or a short wave infrared focal plane array, or any other sensor capable of sensing infrared energy, without departing from the invention. Information from the first channel 226 and one of the image intensification channels 120A, 120B (120B shown) of the image intensification system 100 may be fused together for viewing by an operator through eyepiece 106. Alternatively, information from the first channel 226 may be provided to both image intensification channels and thereby generating a fused image viewable within both eyepieces 106.

The fusion night vision system 300 may be called upon by an operator to view a target or area of interest 108 in a variety of adverse conditions, for example in very low light conditions, through smoke or heavy fog, and sand storms. In each of these conditions the operator may wish to rely more heavily on the thermal channel image than the intensification channel and in other conditions the user may wish to rely more heavily on the image intensification channel than the thermal channel.

The clip-on imager 200 may have a plurality of user actuatable actuators including a first actuator 266 and a second actuator 268. First actuator 266 may be a rotary/pushbutton actuator and may serve multiple purposes. Rotary actuation may control the intensity of the backlight used to illuminate the AMLCD allowing the user to adjust the amount of thermal image content visible within the fused image and push actuation may access a plurality of menu functions, including, the ability to select black hot, white-hot, and outline mode and the ability to take and review pictures. With the white-hot presentation selected, the thermal image is presented with grayscale intensity increasing with object temperature. With the outline presentation selected, edges of objects within the thermal image are visible to minimize obscuration of the higher resolution inherent in the low-light visible imagery. A push and hold (for ~1 second) of the first actuator 266 may activate a single point calibration (SPC) that provides an in field correction of non-uniformity in a focal plane detector. Actuator 266 may be used to turn the system on and off or place the system in a lower power consumption mode. The actuators 266 and 268 may be coupled to a processor on the digital circuit card assembly 240. The clip-on imager 200 may have on-board memory 248 to allow for picture storage. The clip-on imager 200 may also have a programming port 284 and a digital data port 286 for transferring scene and system information and/or pictures.

The clip-on imager 200 may be in a housing 202 separable from the housing 102 of the image intensification system 100. This would allow the clip-on imager 200 to be selectively coupled to an already fielded image intensification system 100 to form a fusion night vision system 300. The clip-on imager 200 may also be used without the image intensification system 100. The clip-on imager 200 may have a portion 272 that is capable of being aligned with at least one of the end portions 130A, 130b (130B shown) of the housing 102. The end portion 272 may have an opening sized to fit over the end portion 130A and a chamfer or lead-in may assist in alignment. The light turning element 232 may be disposed near the periphery of the end portion 272 and take up less than the whole opening. The end portion 272 is shown as a hollow cylinder, but other shapes, including less than a complete cylinder, may be used without departing from the present invention.

A coupling device 270 may be used to removably couple the clip-on imager 200 to the image intensification system 100. The coupling device 270 may be coupled to a feature on the housing 102 of the image intensification system 100. The coupling device 270 may include an opening sized to cooperate with the end portion 132B of the image intensification system 100. A knob 280 may be actuated to alternately lock and unlock the clip-on imager 200 to the image intensification system 100. Alternatively, the coupling device may be a removable fastener.

As shown in FIG. 2, the optical axis of the clip-on imager objective 230 is displaced relative to the image intensifier system objective 124 which may result in a small parallax error or misregistration between the thermal and low-light visible imagery. In object space the parallax error is constant with the range to target and is simply equal to the displacement between the objective lens centers. As viewed through the eyepiece 106, the parallax produces an image misregistration that decreases with range to target, approaching zero for a target at infinity.

The fusion night vision system 300 with the thermal channel 226 offset from the $I^2$ channel 120B can have a parallax problem at either close or far distances. The problem arises because the light path axis of the thermal channel 226 and the light path axis of the $I^2$ channel 120B are aligned such that the fused image of the target at a predetermined distance is aligned in the eyepiece. At distances different than the predetermined distance, the thermal and $I^2$ images are offset in the eyepiece. A parallax correction circuit 280 that receives distance to target information may shift the image of the target or area of interest 108 left, right, up, or down one or more rows or columns in the display 234 to compensate. The parallax correction circuit 280 may receive distance to target information from a mechanical or electrical range finder or from user input. An electrical range finder may utilize an electrical circuit to send out a signal/pulse, for example radar, to bounce off the object in order to acquire the distance to target. A mechanical range finder may require the operator to focus one of the objective focuses on the target and a linear or rotational position sensor 280 coupled to the lens could be used to determine the distance to target. Alternatively, the fusion night vision system 300 may have one or more actuators coupled to the processor that enables the operator to manually shift the image up or down (or left to right) in the display until the thermal image and the $I^2$ image align. The user input may be received through a near/far actuator or a menu selection.

Figure 2B:
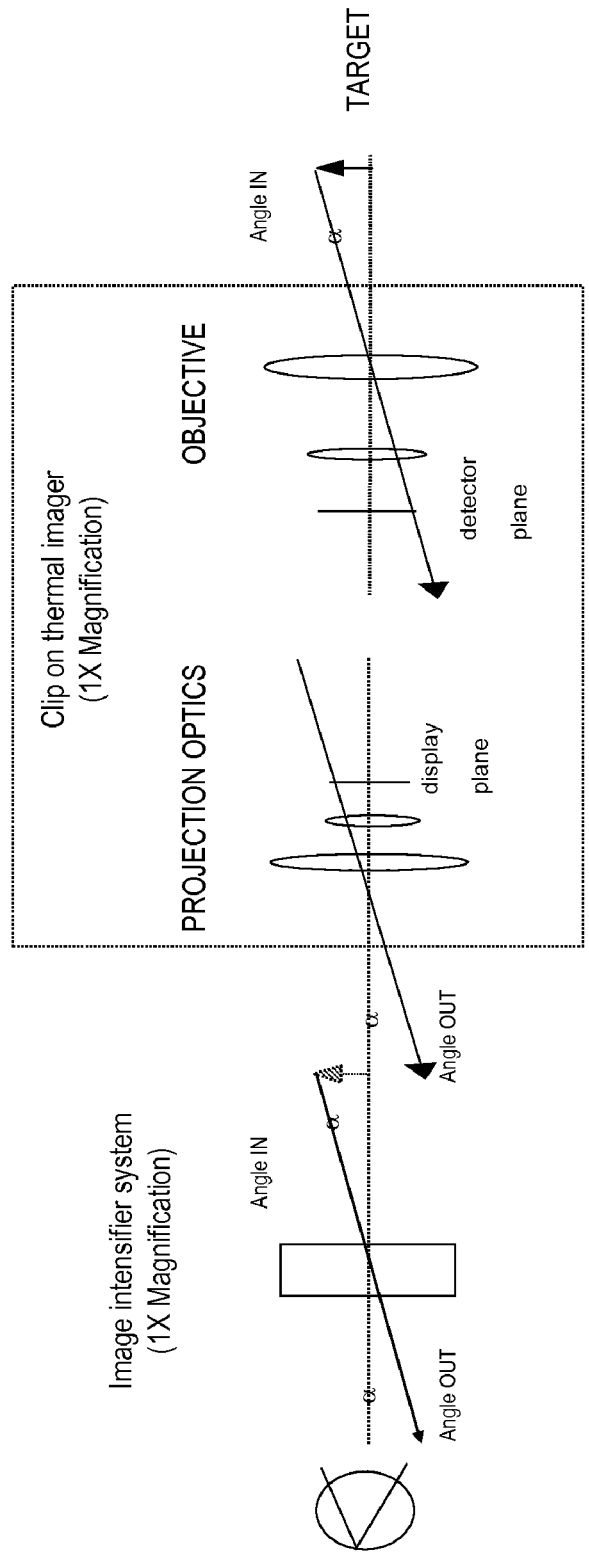

The combination of a display output collimated with the sensor input and near unity magnification throughout the field of view minimizes the sensitivity of the alternative waveband sensor to low-light visible image registration to misalignment of the clip-on imager 200 with the image intensifier system 100. For the unity magnification system, angle to target objects at the system input equals the angle to target objects in the projected output image, as depicted in FIG. 2B. Any angular offset of the input optical axis of the clip-on imager with respect to the image intensifier system produces an equal and self-correcting offset in the collimated output image of the clip-on imager thereby eliminating the need for precise boresight alignment between the systems and providing the ability to rapidly couple the systems together without time-consuming mechanical adjustment.

Figure 3:
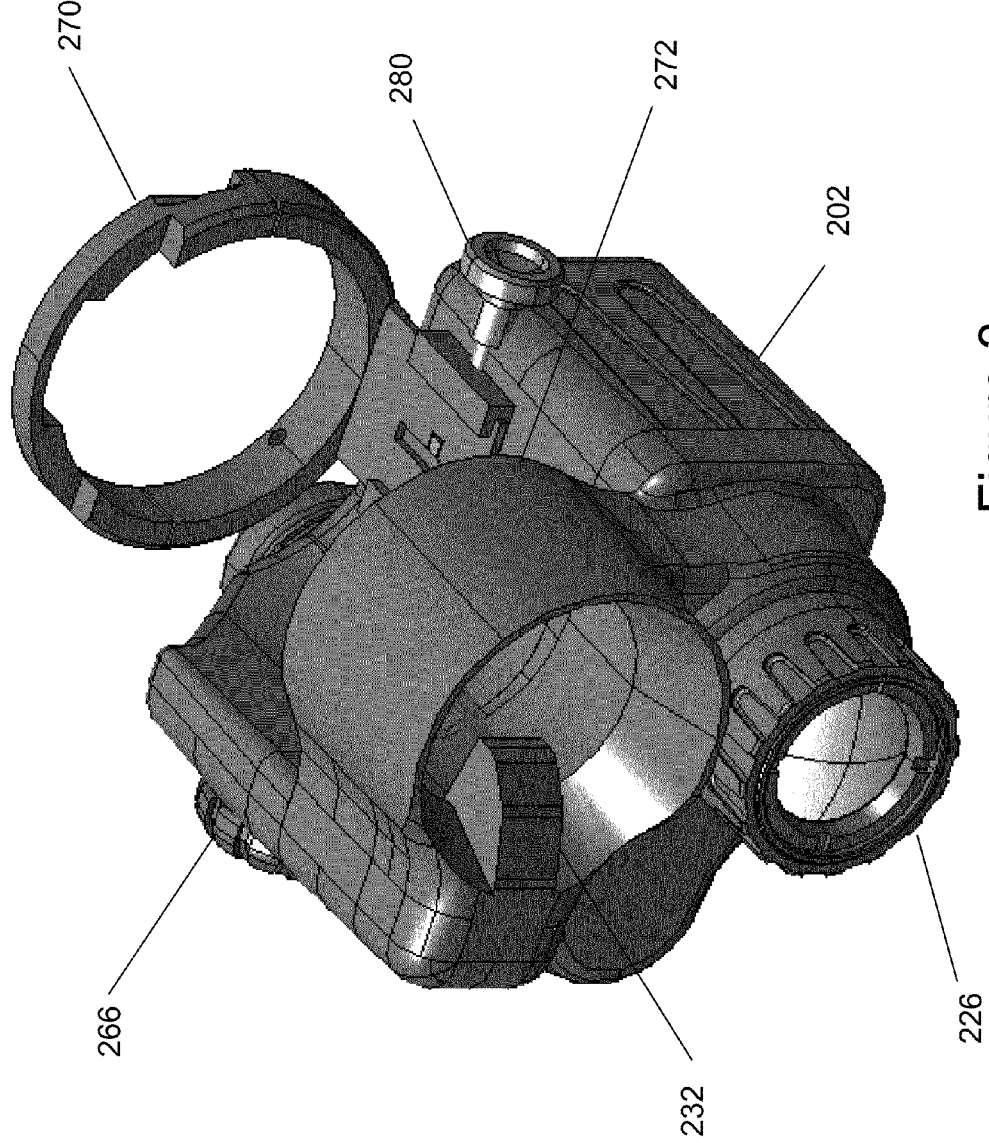
FIG. 3 is a rendering of a clip-on infrared imager consistent with the invention.
Figure 4:
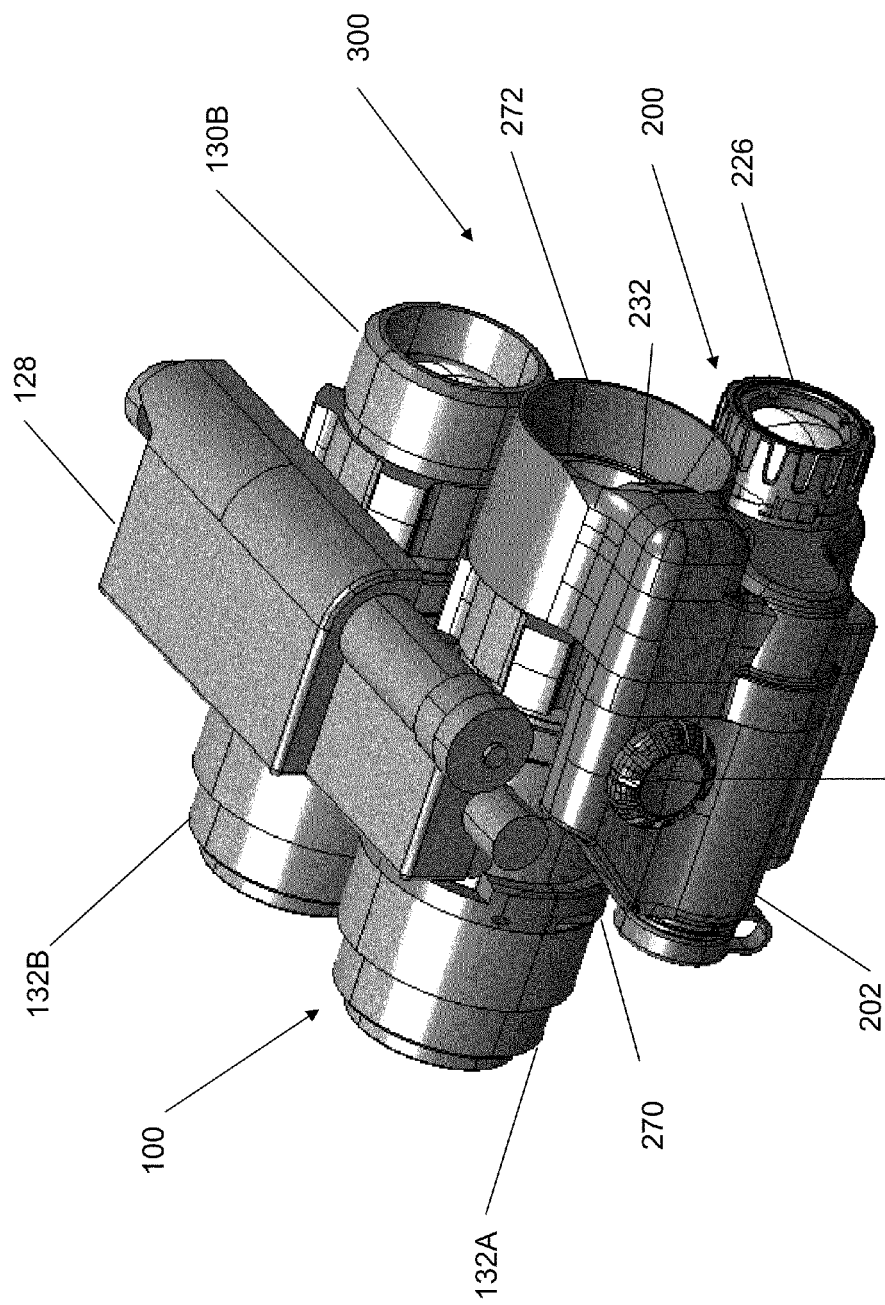
FIG. 4 is a rendering of a fusion night vision system consistent with the invention.
Figure 5:
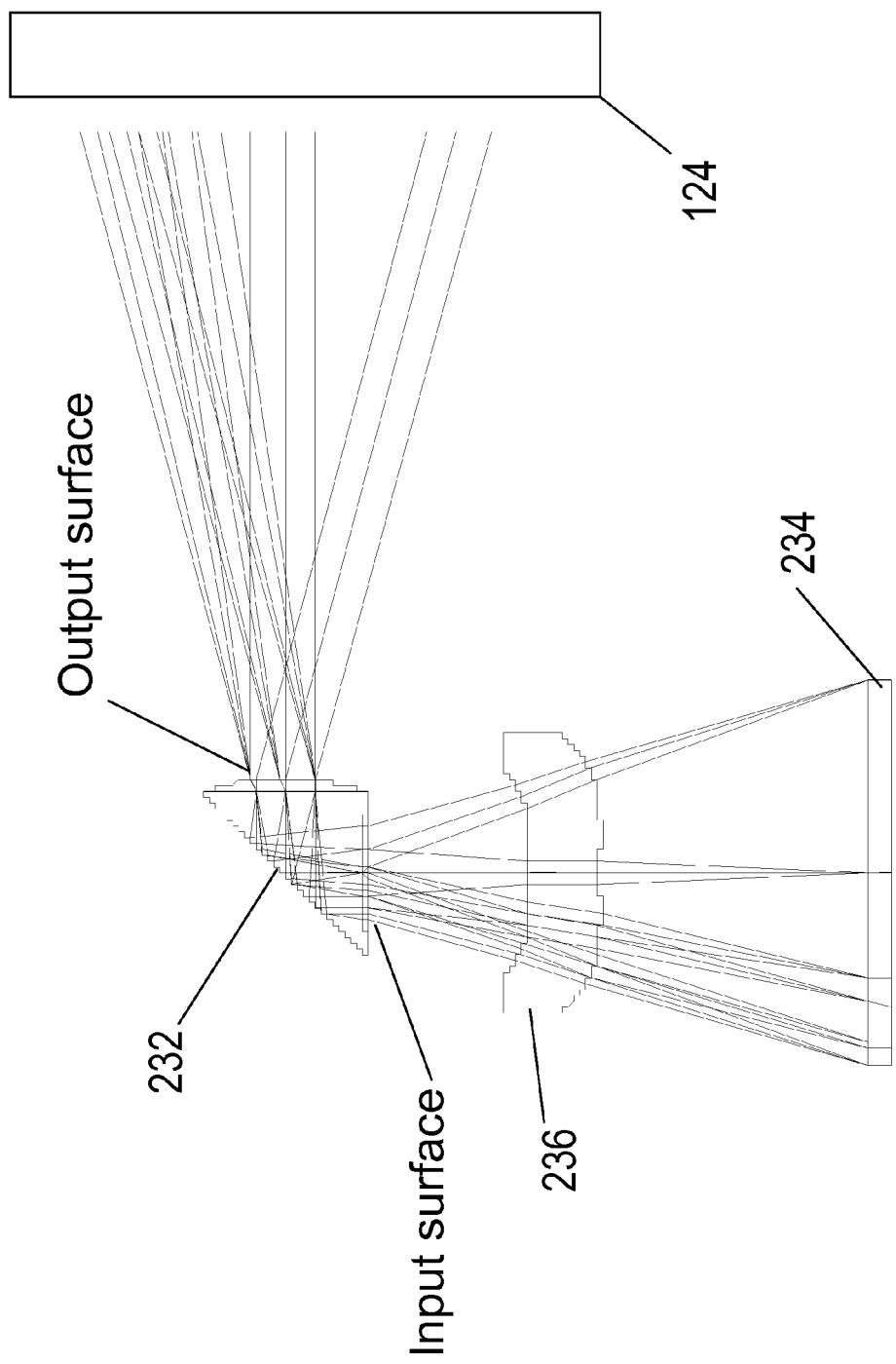
FIG. 5 is a ray diagram for the clip-on infrared imager of FIG. 3.

FIG. 5 is a ray diagram for the clip-on imager 200 of FIG. 3. Scene and system information displayed in the display 234 may travel through corrector lens 236 and light turning element 232. The corrector lens allows for the information present on the display 234 to be injected into the objective lens 124 such that the display 234 image is properly focused by the objective lens 124. The input and output surfaces of the light turning element 232 may act as the collimating projection lenses. The light turning element 232 with input and output lens may be focused to locate the virtual image of the thermal display at infinity. The thermal objective and display projection optics may be closely matched such that the projected image is of unity magnification thereby helping to ensure that the relative size of objects detected in the thermal band matches and overlays 1:1 the view as sensed within the low-light visible band. Further, the optical axis of the thermal objective may be accurately aligned to the optical axis of the display projection optics to ensure that the position of objects detected in the thermal band matches and are aligned to within parallax limits the view as sensed within the low-light visible band.

The optical fusion of thermal image onto the low-light image ideally causes no resolution loss, distortion, or lag in the $I^2$ image. The output of light turning element 232 may subsequently be the input to the objective lens 124 of the image intensifier system. The light turning element 232 of the projection optics allows the display 234 and corrector lens 236 to be positioned away from the image intensifier system objective 124 minimizing the obscuration of the low light visible image by the clip-on imager 200. The light turning element 232 may cover an area of less than 15% of the collection area of the image intensifier system objective 124.

According to an aspect, the present disclosure may provide a scene imager. The imager may include a housing having a portion adapted to be coupled to an image intensification channel of an image intensification system. The imager having a first channel at least partially disposed within the housing for sensing scene information in a first range of wavelengths, a processor for processing the scene information, a display for displaying the scene information, a corrector lens, and a light turning element. The light turning element being coupled to the portion of the housing adapted to be coupled to the image intensification channel for viewing of a fused image by an operator.

According to an aspect, the present disclosure may provide a scene imager. The imager may provide a method of projecting information representative of a scene into an optical path of an image intensification system. The method includes: acquiring information representative of the scene in a first channel configured to sense in a first range of wavelengths; processing the sensed information; and displaying the processed information on a display aligned with a corrector lens and a light turning element disposed outside of an enclosure of the image intensification system.

According to an aspect, the present disclosure may provide a fusion night vision system. The fusion night vision system may include a first housing having a first channel for processing scene information in a first range of wavelengths and a second housing having a second channel for sensing scene information in a second range of wavelengths; a display coupled to the second channel for displaying the sensed scene information, a corrector lens, and a light turning element coupled to a portion of the second housing adapted to be coupled to the first channel for viewing of a combined image by an operator.

Although several embodiments of the invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A scene imager configured to be coupled to a night vision system, the night vision system having one or more image intensification channels at least partially disposed in a night vision system housing, the scene imager comprising:
   - a scene imager housing having a portion configured to be aligned with an input end of one of the one or more image intensification channels of a night vision system, the scene imager housing being separate from the night vision system housing;
   - a first sensor at least partially disposed within the scene imager housing for sensing scene information in a first range of wavelengths;
   - a processor at least partially disposed within the scene imager housing for processing the scene information;
   - a display at least partially disposed within the scene imager housing for displaying the scene information; and
   - a light turning element at least partially disposed within the scene imager housing aligned with the display, the light turning element being coupled to the portion of the scene imager housing configured to be aligned with the input end of the one or more image intensification channels of the night vision system to direct an image of the scene from the first sensor into a viewing area of an objective of the night vision system to enable an operator to view a fused image.

2. The scene imager of claim 1, wherein the first range of wavelengths is greater than 900 nm and the night vision system comprises an image intensifier configured to process scene information in a range of wavelengths less than 900 nm.

3. The scene imager of claim 2, wherein the first sensor is an InGaAs short wave infrared detector array.

4. The scene imager of claim 1, further comprising a corrector lens aligned with the display.

5. The scene imager of claim 4, wherein the corrector lens helps provide a unity power distortion-free image.

6. The scene imager of claim 1, wherein the first sensor is an uncooled microbolometer or infrared focal plane array capable of sensing in the range of wavelengths from 7000 nm to 14,000 nm.

7. The scene imager of claim 1, wherein the light turning element is a selected one of a mirror, a beam splitter and a prism.

8. The scene imager of claim 1, wherein the light turning element is coupled to the portion of the scene imager housing configured to be coupled to the night vision system and occupies less than 15% of the collection area of the night vision system objective.

9. The scene imager of claim 8, wherein the light turning element occupies less than 5% of the collection area of the night vision system objective.

10. The scene imager of claim 1, further comprising a coupling device for removably securing the scene imager housing to the night vision system housing.

11. The scene imager of claim 10, wherein the coupling device has an actuator for decoupling the scene imager from the night vision system.

12. The scene image of claim 1, wherein the processed scene information enters the night vision system through the objective lens from a second side of the objective lens.

13. A method of projecting information representative of a scene into an optical path of a night vision system, the night vision system including one or more image intensification channels at least partially disposed in a night vision system housing, the method comprising the steps of:
  acquiring information representative of the scene with a first sensor of a scene imager, the first sensor being at least partially disposed within a scene imager housing and configured to sense in a first range of wavelengths;
  processing the scene information within the scene imager housing;
  displaying the processed scene information on a display within the scene imager housing; and
  aligning the display with a light turning element of the scene imager, the light turning element being disposed on the object side of an objective lens of the night vision system;
  wherein the scene imager housing is separate from the night vision system housing.

14. The method of claim 13, wherein the light turning element is configured to generate a fused image of the scene when viewed through an eyepiece of the night vision system.

15. The method of claim 13, further comprising the step of locating a corrector lens between the light turning element and the display.

16. The method of claim 15, wherein the corrector lens helps provide a unity power distortion-free image.

17. The method of claim 13, wherein the light turning element occupies less than 15% of the collection area of the objective lens of the night vision system.

18. The method of claim 17, wherein the light turning element occupies less than 5% of the collection area of the objective lens of the night vision system.

19. A scene imager configured to be coupled to a night vision system, the night vision system having an image intensification tube at least partially disposed in a night vision system housing on a first side of an objective lens, the scene imager comprising:
  a scene imager housing having a portion configured to be aligned with an input end of the image intensification tube, the scene imager housing being separate from the night vision system housing;
  a first sensor at least partially disposed within the scene imager housing for sensing scene information in a first range of wavelengths;
  a processor at least partially disposed within the scene imager housing for processing the scene information;
  a display at least partially disposed within the scene imager housing for displaying the processed scene information; and
  a light turning element aligned with the display, the light turning element being coupled to the portion of the scene imager housing configured to be aligned with the input end of the image intensification tube of the night vision system to direct the processed scene information into a viewing area of the objective lens of the night vision system to enable an operator to view a fused image.

20. A fusion vision system, comprising:
  a night vision device having one or more image intensification tubes at least partially disposed in a first housing; and
  a scene imager having a second housing having a portion configured to be aligned with an input end of the one of the one or more image intensification tubes, the second housing being separable from the first housing;
  a first sensor at least partially disposed within the second housing for sensing scene information in a first range of wavelengths;
  a processor at least partially disposed within the second housing for processing the scene information;
  a display at least partially disposed within the second housing for displaying the processed scene information; and
  a light turning element aligned with the display and the input end of one of the one or more image intensification tubes, the light turning element being coupled to the portion of the second housing configured to be aligned with the input end of the image intensification tube of the night vision system to direct the processed scene information through an objective lens of the night vision system and into the one image intensification tube.

* * * * *